May 22, 1956 M. L. DOELZ 2,747,084

VARIABLE BAND WIDTH INTERMEDIATE FREQUENCY SYSTEM

Filed May 7, 1953 3 Sheets-Sheet 1

INVENTOR.
MELVIN L. DOELZ
BY
Marvin Moody
ATTORNEY

VARIABLE BAND WIDTH INTERMEDIATE FREQUENCY SYSTEM

Filed May 7, 1953 3 Sheets-Sheet 2

INVENTOR.
MELVIN L. DOELZ
BY Marvin Moody
ATTORNEY

May 22, 1956 M. L. DOELZ 2,747,084

VARIABLE BAND WIDTH INTERMEDIATE FREQUENCY SYSTEM

Filed May 7, 1953 3 Sheets-Sheet 3

INVENTOR.
MELVIN L. DOELZ
BY Marvin Moody
ATTORNEY 2,747,084

VARIABLE BAND WIDTH INTERMEDIATE FREQUENCY SYSTEM

Melvin L. Doelz, Glendale, Calif., assignor to Collins Radio Company, Cedar Rapids, Iowa, a corporation of Iowa Application May 7, 1953, Serial No. 353,644

6 Claims. (Cl. 250—20)

This invention relates in general to a variable band width system and in particular to means for independently adjusting the high and low frequency sides of the band width.

In communications it is oftentimes desirable to separate a signal at a particular frequency from another signal with a slightly different frequency. As is well known to those skilled in the art, there are many radio frequencies being transmitted and some means for selectively choosing the desired signal must be provided. The present invention allows a radiant energy receiver to be adjusted so that its bandpass characteristic may be broadened or narrowed as desired. This may be accomplished by changing one or both edges of the bandpass frequency response characteristic independently. It utilizes a pair of highly selective filters which have fixed band pass characteristics and which might be, for example, electromechanical filters such as described in the co-pending patent applications of Melvin L. Doelz entitled "Mechanical Filters" and "Longitudinal Support of Mechanical Filter" respectively, Serial Numbers 248,011 Pat. 2,717,361—September 6, 1955, and 283,340 Pat. 2,693,579—November 2, 1954, filed September 24, 1951, and April 21, 1952, respectively. Such filters have frequency response curves with very steep sides.

It is an object of this invention therefore to provide a variable bandpass apparatus for an electronic system wherein the pass band may be varied.

Another object of this present invention is to provide an electronic selective device wherein either or both edges of a frequency response curve may be adjusted independently to obtain bandpass control.

A feature of this invention is found in the provision for a pair of highly selective filters which are combined with a pair of variable oscillators and four mixers.

Further objects, features and advantages will become apparent from the following description and claims when read in view of the drawings, in which:

Figure 1:
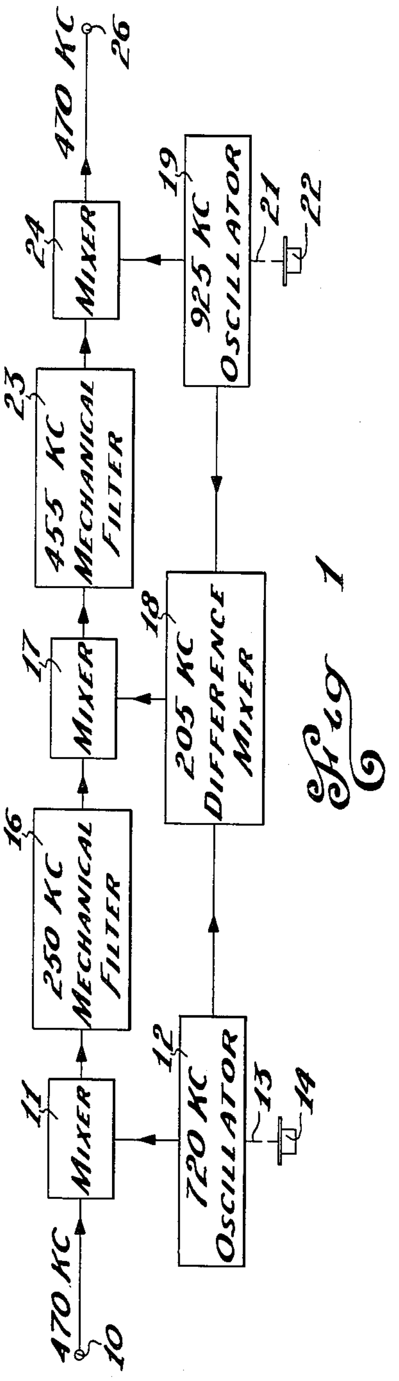
Figure 1 is a schematic illustration of the apparatus of this invention.

Figure 1 illustrates an input terminal 10 which supplies an input to a first mixer 11 that also receives an input from a first oscillator 12. The first oscillator 12 has a frequency control shaft 13 to which a knob 14 is attached. The first mixer 11 has its output connected to an electromechanical filter 16 such as described in the co-pending applications Serial Numbers 248,011 and 283,340 filed September 24, 1951, and April 21, 1952, respectively.

A second mixer 17 receives the output of the first mechanical filter 16 and a second input from a difference mixer 18. A second oscillator 19 has a control shaft 21 to which is connected a knob 22 and supplies a first input to the difference mixer 18.

The mixer 18 also receives an input from the oscillator 12 and produces an output that is supplied to the mixer 17, which is the difference between the frequency of the oscillators 12 and 19. A second mechanical filter 23 receives the output of mixer 17. A fourth mixer 24 receives the output of the mechanical filter 23 and an input from the second oscillator 19. The output of mixer 24 is connected to an output terminal 26.

For purposes of illustration particular frequencies will be assigned to the various components of the invention but it is to be realized that other frequencies may be utilized. Suppose that an incoming signal with a frequency of 470 kilocycles is supplied to terminal 10, and suppose that the oscillator 12 is tunable over a range which includes 720 kilocycles. The first mechanical filter 16 has the center of its frequency response at 250 kilocycles with a band width of four kilocycles.

The second oscillator 19 might be tunable over a range which includes 925 kilocycles and the second mechanical filter 23 may have the center of its frequency response at 455 kilocycles with a four kilocycle band width.

When the oscillators 12 and 19 are tuned to these frequencies, the band width of the system will be a maximum of four kilocycles determined by the band width of the filters 16 and 23. However, if one of the oscillators is changed in frequency, the band width of the apparatus will be decreased. If desired, one oscillator may be used to control the high frequency edge of the response curve and the other oscillator used to control the low frequency side of the response curve so that any band width between four kilocycles and zero is obtainable.

To illustrate how the maximum band width of the system is decreased, let it be assumed that the frequency of the oscillator 12 is decreased from 720 kilocycles to 719 kilocycles. In this event the output of the mixer 11 will be 249 kilocycles rather than 250 kilocycles. The output of the difference mixer 18 will be 206 kilocycles rather than 205 kilocycles, and thus a portion of the signal passing the first mechanical filter 16 will be above the pass band of the second mechanical filter 23. The results in a decrease in band width of one kilocycle on the high side of the band. It is to be noted, however, that the output frequency supplied to the output terminal 26 will not change as the oscillator 12 is varied, but will remain at 470 kilocycles.

This is true because the outputs of the oscillators 12 and 19 are subtracted in the difference mixer 18 and changes in the oscillators are compensated. For example, a decrease in frequency of oscillator 12 results in an increase in the frequency from the difference mixer 18. Changing the frequency of oscillators 12 and 19 will change the band width of the system.

Figures 2, 3, 7, 8:
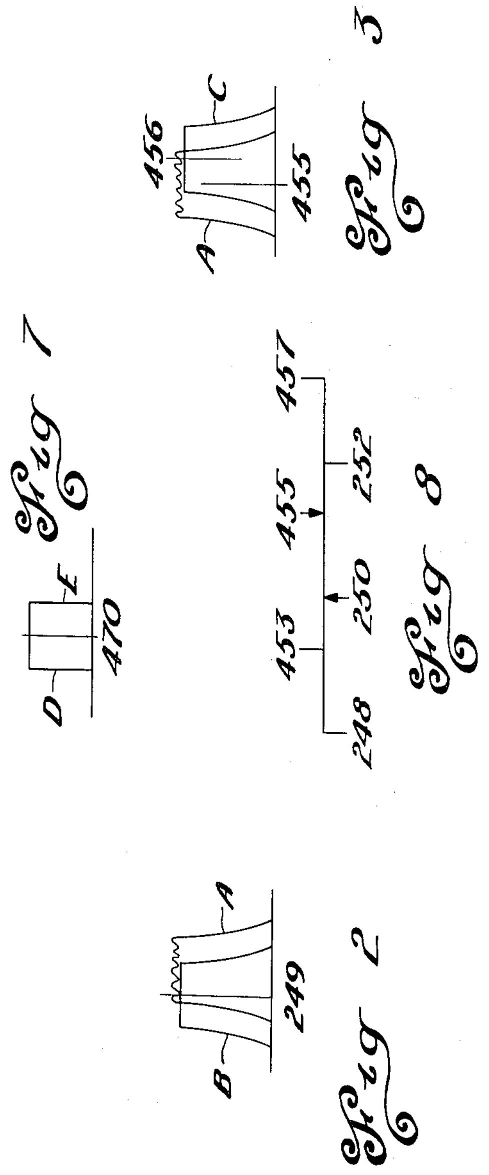
Figure 2 is a curve illustrating how the bandpass may be varied.
Figure 3 is a second curve illustrating how the bandpass may be varied.
Figure 7 illustrates a possible presentation to illustrate the frequency response of the system; and, Figure 8 illustrates how the band width is controlled.

Figures 2 and 3 illustrate how the band width is controlled. The curve A illustrates the frequency response of the mechanical filter 16 and the curve B illustrates the output of mixer 11 when oscillator 12 is tuned to 719 kilocycles, assuming a four kilocycle reference band width. It will be noted that the low side of the curve B falls outside of the response curve of the filter A and will therefore not be passed to the mixer 17.

Figure 3 illustrates the curve A with a curve C superimposed on it from the output of mixer 17. Thus, by adjusting the oscillators 12 and 19 the bandpass of the system may be decreased below four kilocycles, which is the limiting band width of the filters 16 and 23.

Figure 7 illustrates a frequency and limits D and E on either side with one limit controllable by one of the oscillators and the other controllable by the second oscillator. The first limit D might be variable, for example, from minus 2 to 0 kilocycle and the other limit E might be adjustable from 0 to plus 2 kilocycles, thus allowing the total band width to be changed between four kilocycles to 0.

Figure 8 illustrates how the oscillators 12 and 19 shift the inputs to the filters 16 and 23. It is to be realized that only the signals passing both filters will appear at the output terminal 26.

Figure 4:
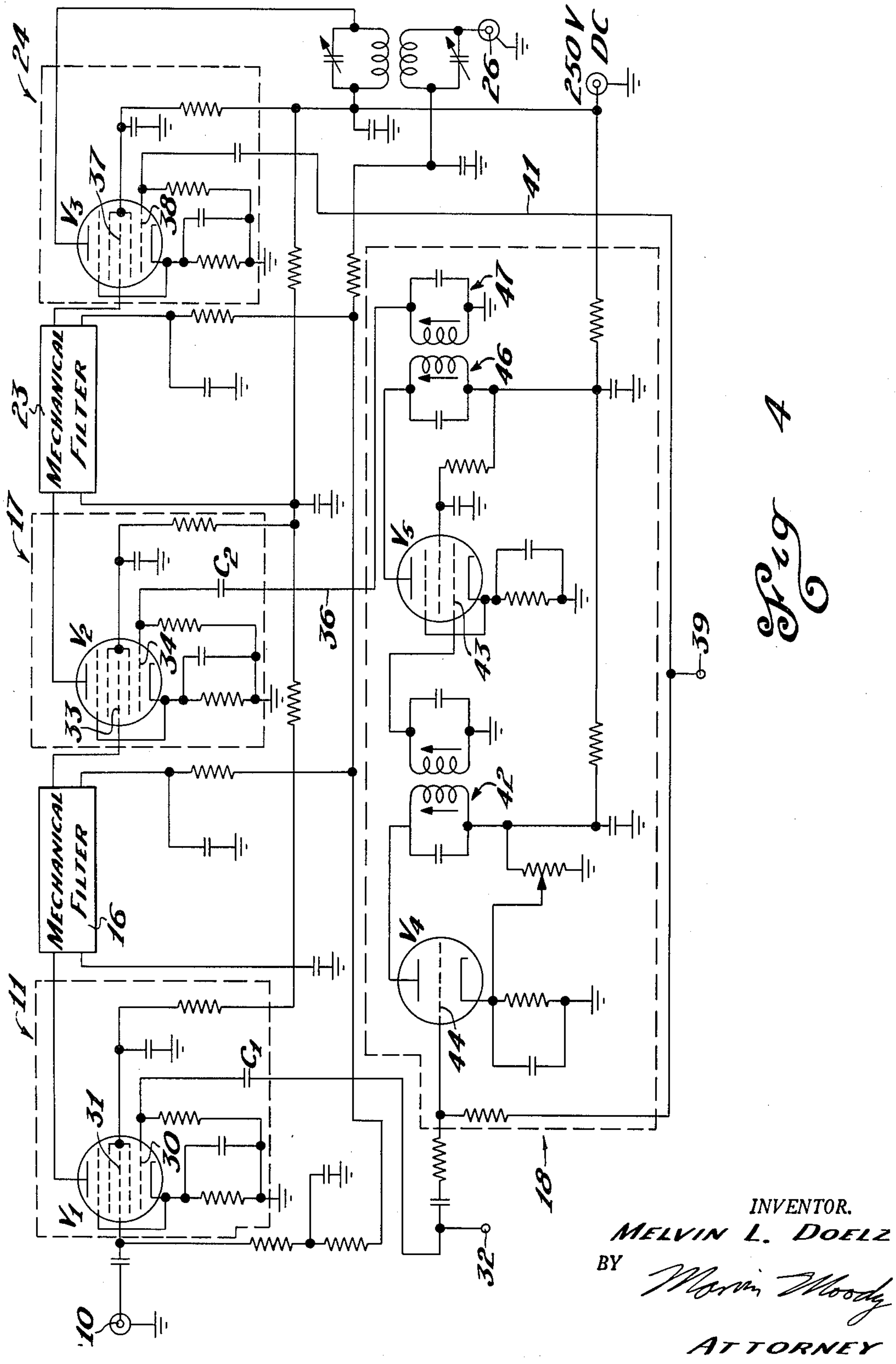
Figure 4 is a detailed schematic view illustrating a portion of the circuitry of Figure 1.
Figure 5:
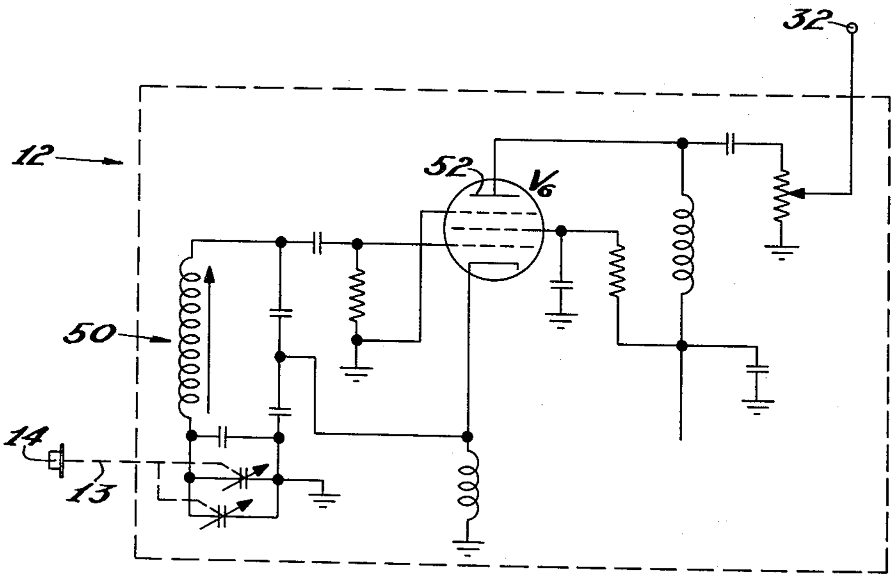
Figure 5 illustrates one of the oscillators shown in Figure 1.
Figure 6:
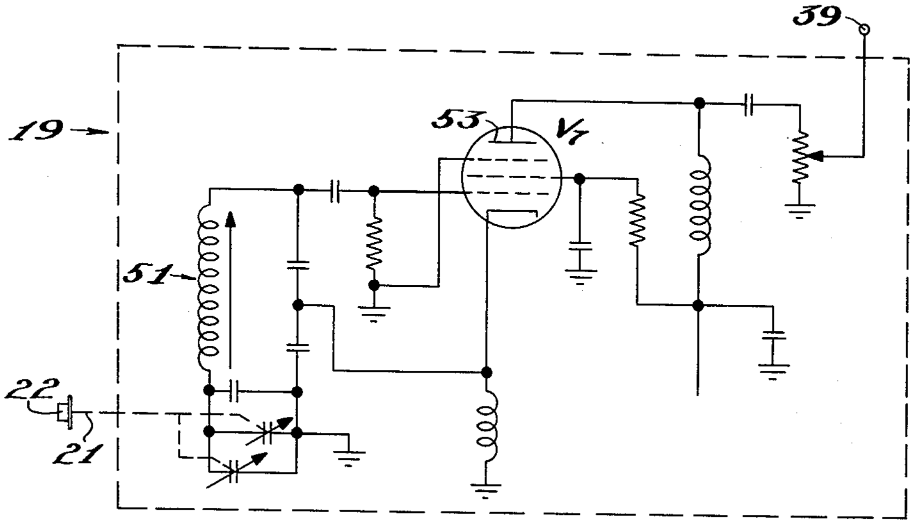
Figure 6 shows a second oscillator shown in Figure 1.

The detailed circuitry of the system is shown in Figures 4, 5 and 6, wherein it is seen that the mixer 11 comprises a mixing tube $V_1$ which has one of its mixing grids 31 connected to the input terminal 10 and which receives a second input on grid 30 from the oscillator 12 through the coupling condenser $C_1$ connected to terminal 32 which is in turn connected to the oscillator 12 shown in Figure 5.

The output of the tube $V_1$ is connected to the mechanical filter 16. The output of the filter 16 is connected to one of the input grids 33 of tube $V_2$ of a second mixer 17. An input is connected to grid 34 of tube $V_2$ by lead 36 through condenser $C_2$ from the difference mixer 18.

The output of the mixer 17 is connected to the second mechanical filter 23. The third mixer 24 has a tube $V_3$ which has one of its grids 37 connected to the output of the mechanical filter 23 and a second grid 38 which is connected to a terminal 39 through the lead 41 to which the oscillator 19 shown in Figure 6 is connected.

The difference mixer 18 includes a pair of tubes $V_4$ and $V_5$. The tube $V_4$ may be a triode amplifier which has a tuned output circuit 42 coupled to a grid 43 of the mixer tube $V_5$. The terminal 32 is connected to the oscillator 12 and terminal 39 is connected to oscillator 19 so that grid 44 of tube $V_4$ receives both signals. They are amplified and coupled to tube $V_5$. A tuned circuit 46 is connected in the plate circuit of tube $V_6$ and is coupled to a second tuned circuit 47 which is connected by a lead 36 to the mixer 17.

The oscillators 12 and 19 are illustrated in Figures 5 and 6, respectively, and may be any one of a number of well known types which have frequency determining tunable circuits 50 and 51 that are coupled to the grids and the cathodes of tubes $V_6$ and $V_7$. The plates 52 and 53 of the oscillator tubes are coupled to the output terminals 32 and 39, respectively. It is to be realized, of course, that variation of the tunable elements in the tuning circuits 50 and 51 changes the resonant frequency of the oscillators.

It is thus seen that this invention provides a circuit which allows the band width to be varied.

Although it has been described with respect to a particular embodiment thereof, it is not to be so limited as changes and modifications may be made therein which are within the full intended scope of the invention, as defined by the appended claims.

I claim:

1. A variable band width apparatus comprising, a first mixer receiving an input signal, a first mechanical filter receiving the output of the first mixer, a second mixer receiving the output of the first mechanical filter, a second mechanical filter receiving the output of the second mixer, a third mixer receiving the output of the second mechanical filter, a first oscillator supplying an input to the first mixer, a second oscillator supplying an input to the third mixer, and a difference mixer receiving inputs from the first and second oscillators and supplying an output to the second mixer which is the difference frequency between the first and second oscillators.

2. A variable band pass apparatus comprising, a pair of oscillators, a pair of filters, three mixers, a difference mixer, the first oscillator supplying an input to the first mixer and the difference mixer, the second oscillator supplying an input to the third mixer and the difference mixer, the difference mixer supplying an input to the second mixer, the first filter receiving an input from the first mixer and supplying an output to the second mixer, and the second filter receiving the output of the second mixer and supplying an input to the third mixer.

3. Apparatus for varying the band pass in electronic apparatus comprising, first, second and third mixers, first and second highly selective filters, first and second oscillators, a difference mixer, an input signal supplied to the first mixer, said first oscillator connected to said first mixer to supply an input thereto, said first highly selective filter receiving the output of the first mixer and supplying an input to the second mixer and with the center of its band pass at a frequency equal to the difference between the output of the first oscillator and the input signal, the difference mixer receiving inputs from the first and second oscillators and supplying an output to the second mixer, the second highly selective filter receiving the output of the second mixer and supplying an input to the third mixer, the second oscillator supplying inputs to the third mixer, and said second highly selective filter with the center of its band pass characteristic at the sum of the output of the difference mixer and the first highly selective filter.

4. A variable band pass apparatus comprising, a pair of variable oscillators, a pair of highly selective filters, three mixers, a difference mixer, the first variable oscillator supplying an input to the first mixer and the difference mixer, the second variable oscillator supplying an input to the third mixer and the difference mixer, the difference mixer supplying an input to the second mixer, the first mechanical filter receiving an input from the first mixer and supplying an output to the second mixer, and the second highly selective filter receiving the output of the second mixer and supplying an input to the third mixer.

5. A variable band pass apparatus comprising, an input terminal receiving an input signal, first, second and third mixers, first and second mechanical filters, first and second variable oscillators, a difference mixer receiving inputs from the first and second oscillators and supplying an output to the second mixer which is equal to the difference frequency of the first and second oscillators, an output terminal connected to the output of the third mixer, said first mixer receiving an input from the first variable oscillator, said third mixer receiving an input from the second variable oscillator, said first mechanical filter receiving an input from the first mixer and supplying an output to the second mixer, said second mechanical filter receiving an input from the second mixer and supplying an output to the third mixer, said first mechanical filter having the center of its band pass frequency equal to the difference between the input signal and the normal frequency of the first oscillator, and the second mechanical filter having a center frequency which is equal to the center frequency of the first mechanical filter plus the normal output of the difference mixer.

6. A variable band width system comprising, an input terminal receiving an input signal, a first mixer having a first electron tube receiving an input from said input terminal on a mixer grid, a first variable oscillator supplying an input to said mixer which is impressed on a second grid of said first tube, a mechanical filter receiving the output from said mixer with a center frequency equal to the difference between the input signal and the normal output of the first oscillator, a difference mixer, a second variable oscillator, said difference mixer receiving inputs from the first and second variable oscillators, a second mixer with a second electron tube which receives the output of the difference mixer on one of its grids, the output of the first mechanical filter connected to a second grid of the second tube, a second mechanical filter connected to the output of the second mixer, a third mixer having a third tube with one of its grids connected to the output of the second mechanical filter and another grid connected to the output of the second variable oscillator, and an output terminal connected to the output of the third mixer.

References Cited in the file of this patent

UNITED STATES PATENTS

| | | |
|---|---|---|
| 1,993,395 | Beers | Mar. 5, 1935 |
| 2,470,892 | Hepp | May 24, 1949 |
| 2,510,906 | Reid | June 6, 1950 |
| 2,608,648 | Magnuski | Aug. 26, 1952 |